(12) United States Patent
Smith

(10) Patent No.: US 7,201,555 B1
(45) Date of Patent: Apr. 10, 2007

(54) PALLET LOADER AND SEPARATOR

(76) Inventor: Ronald Earl Smith, 5165 Viceroy Ave., Norco, CA (US) 92860

( * ) Notice: Subject to any disclaimer, the term of this patent is extended or adjusted under 35 U.S.C. 154(b) by 274 days.

(21) Appl. No.: 10/946,160

(22) Filed: Sep. 21, 2004

Related U.S. Application Data

(60) Provisional application No. 60/506,421, filed on Sep. 29, 2003.

(51) Int. Cl.
*B65G 59/06* (2006.01)
(52) U.S. Cl. .............. 414/797.5; 414/797.4; 414/798.4
(58) Field of Classification Search ............ 198/345.1, 198/468.8; 414/797.4, 797.8, 798.1, 798.4, 414/798.5, 795.4
See application file for complete search history.

(56) References Cited

U.S. PATENT DOCUMENTS

| | | | | |
|---|---|---|---|---|
| 3,069,050 A | * | 12/1962 | Brettrager | 414/797.5 |
| 3,757,971 A | * | 9/1973 | Frish | 414/797.5 |
| 4,701,092 A | * | 10/1987 | Reynaud et al. | 414/796.1 |
| 4,743,154 A | * | 5/1988 | James et al. | 414/788.5 |
| 4,960,362 A | * | 10/1990 | Karpisek | 417/797.4 |
| 6,139,254 A | * | 10/2000 | Ouellette | 198/345.1 |

* cited by examiner

*Primary Examiner*—James R. Bidwell
(74) *Attorney, Agent, or Firm*—Knobbe, Martens, Olson & Bear, LLP

(57) ABSTRACT

A system for loading pallets onto an assembly line wherein the system has at least one arm capable of lifting a stack of pallets and then depositing the bottom-most pallet of the stack of pallets onto an assembly line surface for subsequent delivery to the assembly line.

20 Claims, 9 Drawing Sheets

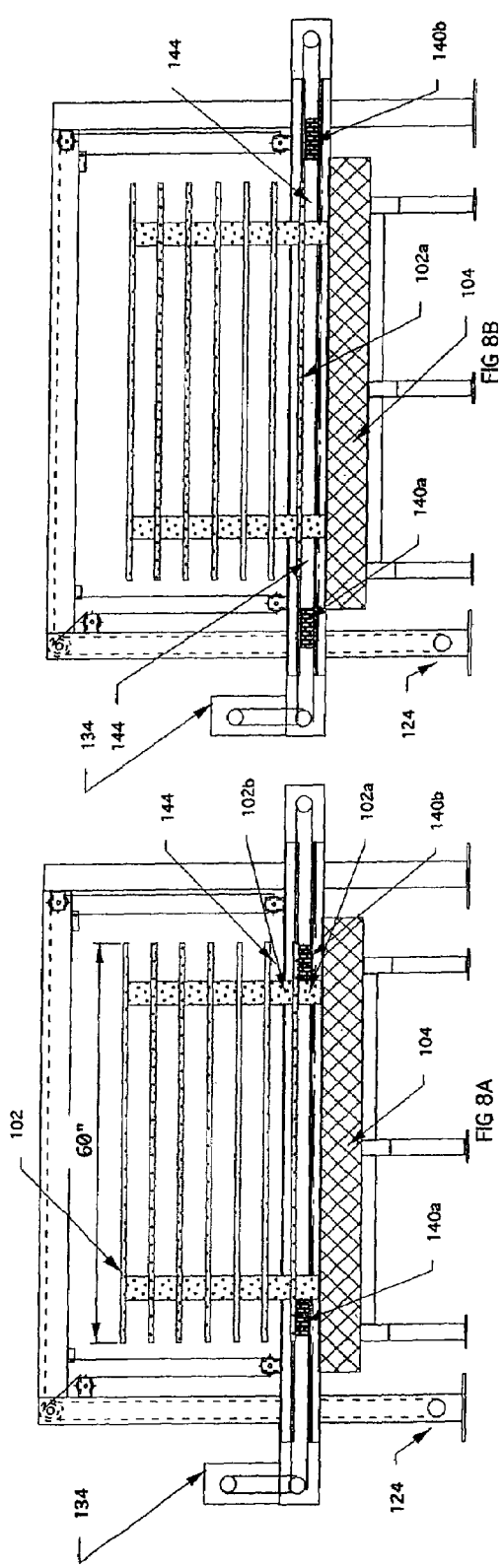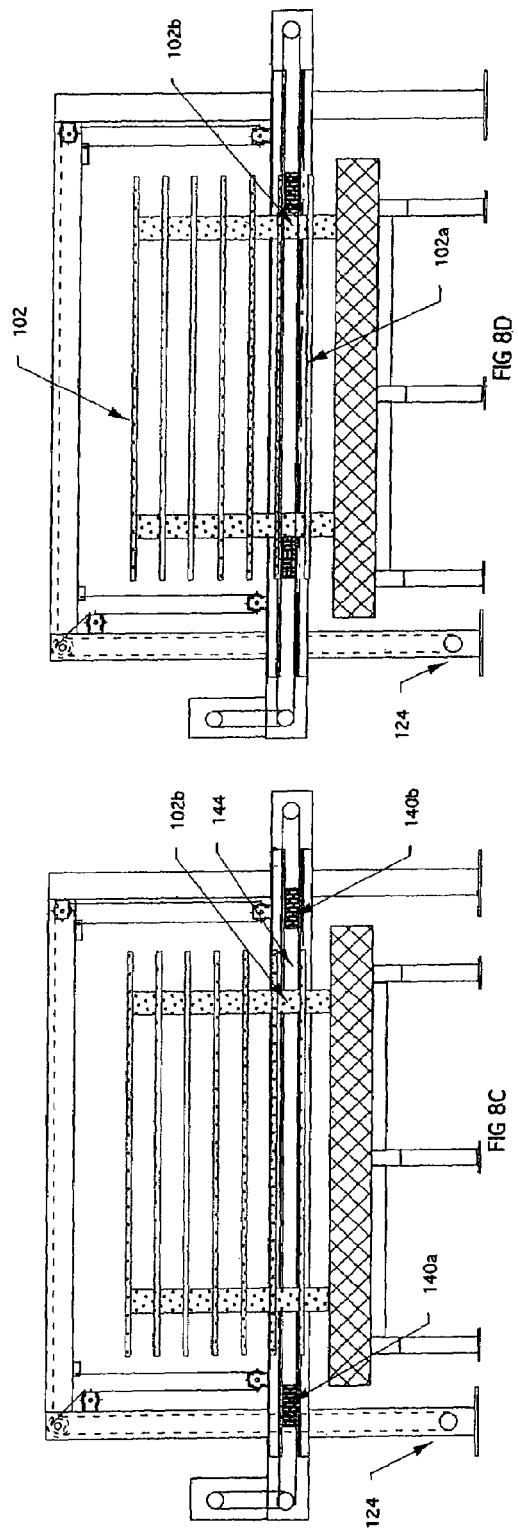

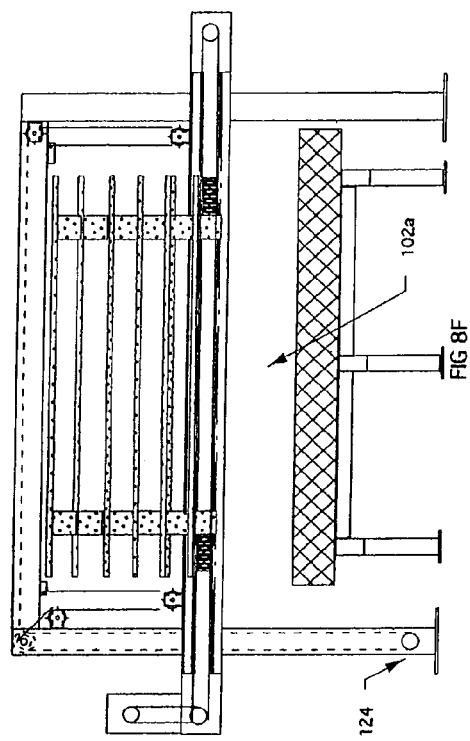
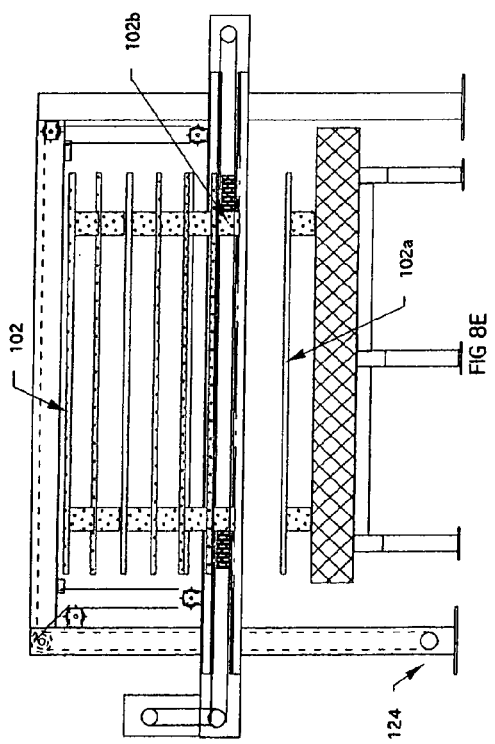
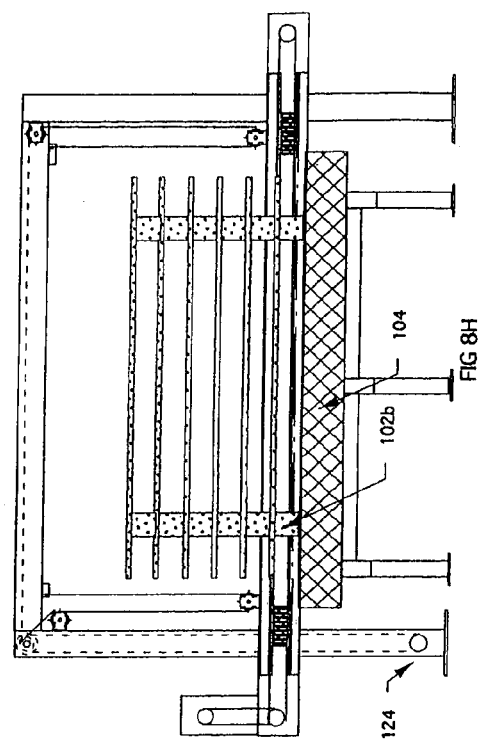
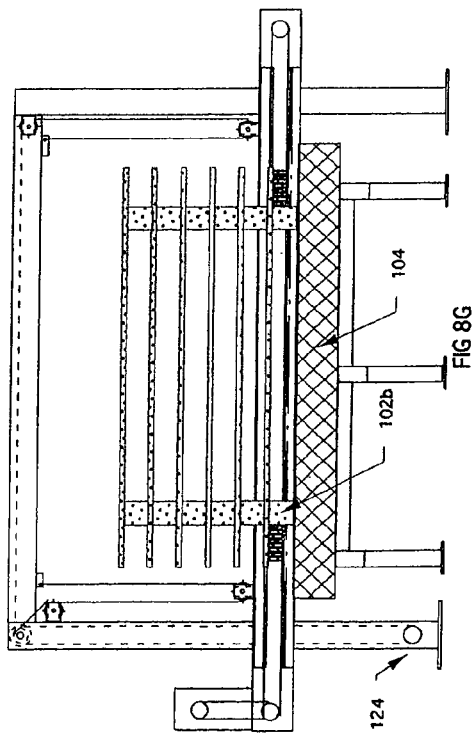

PALLET LOADER AND SEPARATOR

PRIORITY CLAIM

This application claims the benefit of U.S. Provisional Application No. 60/506,421, filed on Sep. 29, 2003, which is hereby incorporated by reference in it entirety.

BACKGROUND OF THE INVENTION

1. Field of the Invention

The present invention relates to factory machinery and, in particular, concerns an apparatus and method of loading pallets onto assembly lines and like devices.

2. Description of the Related Art

The use of pallets in manufacturing or shipping is very common. A pallet typically comprises a first series of parallel pieces of wood that are secured to two or more cross pieces such that the parallel pieces of wood define a surface that can receive heavy objects. The cross pieces elevate the surface off of the ground allowing a fork truck arm to be inserted under the surface to allow for easily lifting and transport of the heavy object. Optionally, a second set of parallel pieces of wood or the like can also be attached to the cross pieces to define a second surface thereby providing greater stability for the pallet. The cross pieces are typically parallel pieces of 2×4's or the like that are inset from the outer perimeter of the first and second surfaces so as to define a gap. Further, there is a partially enclosed space located inwards of the cross pieces such that the partially enclosed space can also receive blades of a forklift or a fork truck to thereby allow the pallet to be moved by the forklift or fork truck.

Hence, the configuration of pallets are well suited to allow fork trucks and forklifts to move heavy pieces of equipment or other heavy objects that have been positioned on the pallet. As a consequence, pallets are often an important part of a manufacturing line where every heavy object that is produced on the manufacturing line is ultimately secured to a pallet for subsequent shipment. As such, manufacturing lines often require the introduction of multiple pallets into the line to thereby allow the heavy objects to be secured to the pallets.

Typically, pallets are hand loaded onto the production line by workers which is inefficient and time consuming. In particular, two workers must physically lift each pallet onto the assembly line as it is needed. The repetitious nature of this work can result in injuries to workers. Moreover, the time it takes for two workers to load the pallets may slow down the production assembly line As a consequence, there is a need for an improved system for loading pallets onto manufacturing lines and, in particular, a way of automating the process by which pallets are positioned on the manufacturing lines.

SUMMARY OF THE INVENTION

The aforementioned needs are satisfied by the pallet loading apparatus of the present invention which, in one aspect, comprises at least one arm that engages with a pallet. The at least one arm in this aspect is attached to a lifting mechanism such that the at least one arm can lift a pallet above an assembly line surface and wherein the at least one arm and lifting mechanism is configured such that a stack of pallets can be lifted above the assembly line surface. The lifting mechanism and the at least one arm are further configured, in this aspect, such that the at least one arm can deposit the bottom-most pallet in the stack of pallets onto the surface and then disengage from the bottom-most pallet so as to position the bottom-most pallet on the assembly line surface for subsequent transportation of this pallet on the assembly line.

The pallet loading apparatus can either be under user control using a control interface, such as buttons and the like, or can be automated such that the assembly line can induce the apparatus to provide a pallet onto the assembly line surface on an as needed basis for subsequent transportation along the assembly line as is needed by the assembly line. By automating the loading of pallets onto the assembly line, less labor is required by individuals in order to provide pallets to the assembly line and greater efficiencies and savings in manufacturing can be achieved. These and other objects and advantages of the present invention will become more apparent from the following description taken in conjunction with the accompanying drawings.

DETAILED DESCRIPTION OF THE ILLUSTRATED EMBODIMENT

Figure 1:
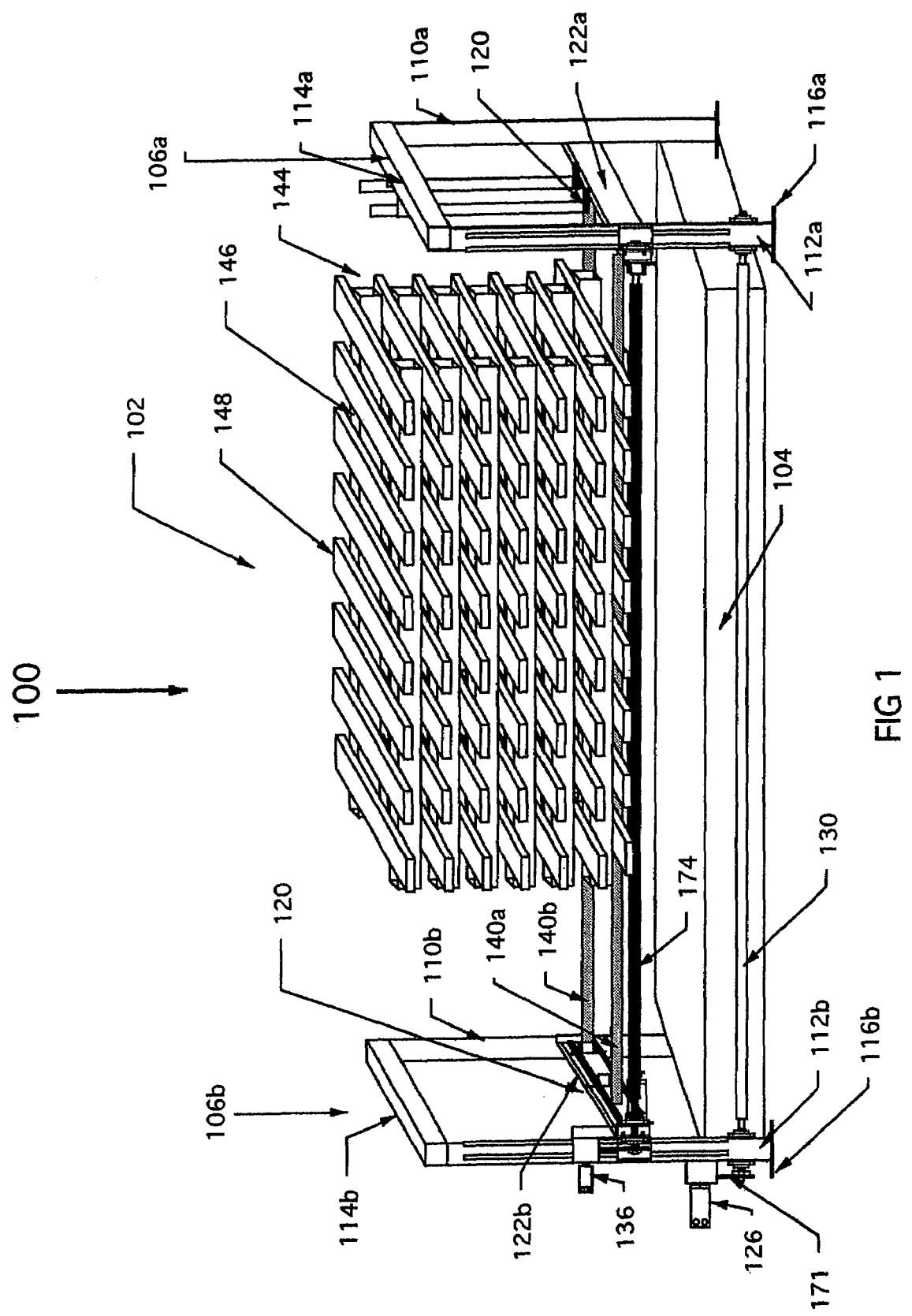
FIG. 1 is prospective view of the pallet loading apparatus of the illustrated embodiment.

Reference will now be made to the drawings wherein like numerals refer to like parts throughout. FIG. 1 is a perspective view of a pallet loading system 100 of the illustrated embodiment. As is illustrated, the system 100 is adapted to receive a plurality of pallets 102 and, as will be described in greater detail below, selectively position the plurality of pallets 102 one by one onto an assembly line surface 104. In this manner, the plurality of pallets 102 can be initially loaded into the pallet loader system 100 and then supplied to an assembly line as needed without requiring individuals to individually carry and maneuver each of the pallets.

Figure 2:
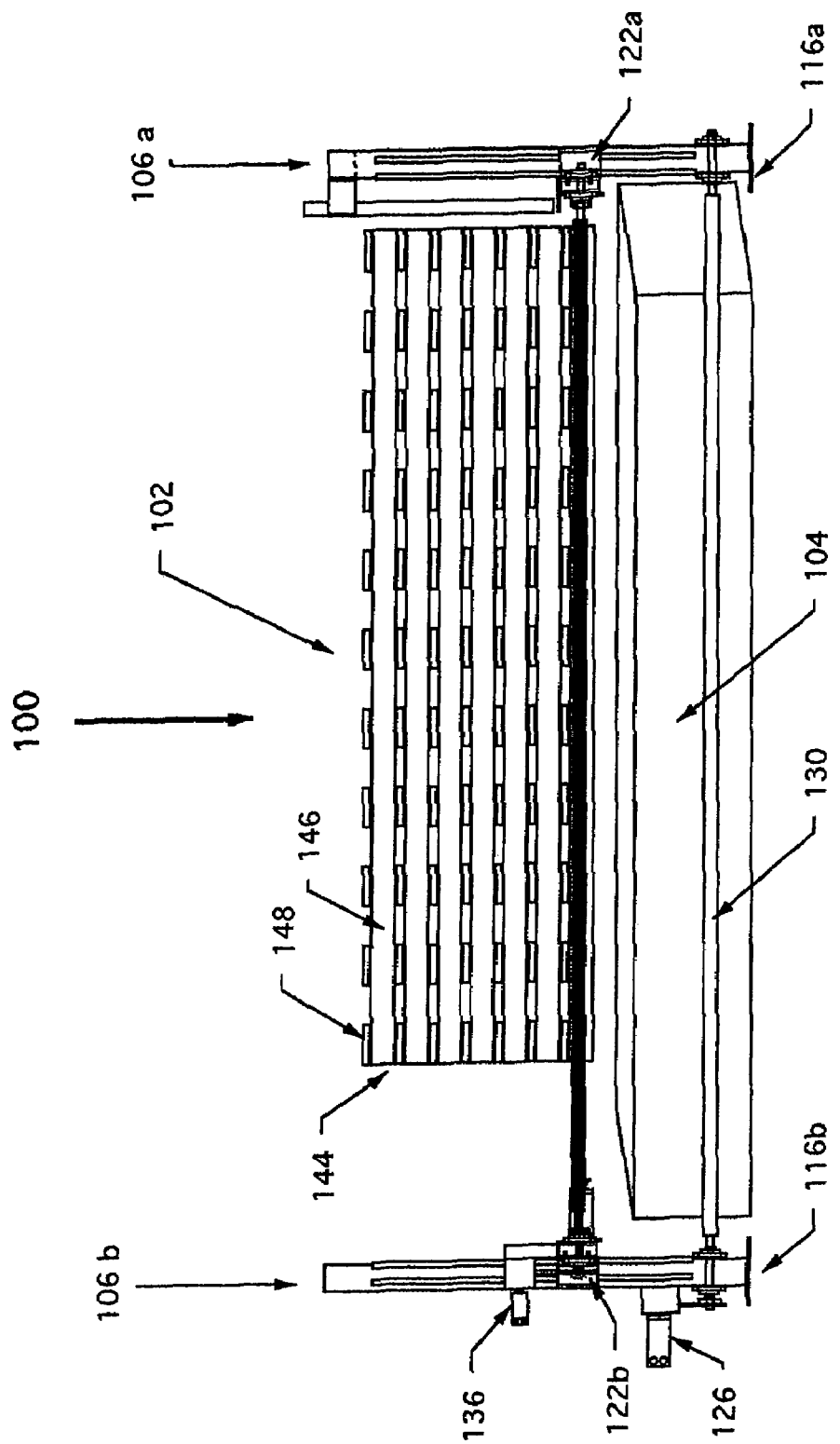
FIG. 2 is a front view of the pallet loading apparatus of FIG. 1.

As is illustrated in FIGS. 1 and 2, the pallet loading system 100 of the illustrated embodiment include two side-wall frames 106a and 106b. In this particular implementation, the side-wall frames each comprise two vertical members 110a, 110b and 112a, 112b. In this particular implementation, they are secured to the floor via mounting brackets 116a, 116b in a manner that is known in the art. Preferably the vertically extending members 110, 112 are spaced apart from each other a distance that is substantially equal to the thickness of the pallets that are to be used on the pallet loading machine. For structural rigidity, a cross piece 114a, 114b interconnects the vertically extending members 110a, 112a and 110b, 112b.

As is also illustrated in FIGS. 1 and 2, the system 100 further includes a moveable carriage assembly 120 that is vertically moveable up and down along the vertical members 110a, 110b and 112a, 112b so as to be able to vertically move the pallets to thereby lift the pallets up off of the assembly line surface 104 and also to allow for individual pallets to be deposited on the assembly line surface 104 in the manner that will be described below. The carriage assembly 120, in this embodiment, includes two moveable carriage members 122a, 122b that are respectively connected to the side-wall frames 106a, 106b so as to extend between the vertical members 110, 112. The carriage members 122a, 122b are track mounted so as to be vertically moveable up and down the vertical members 110a, 110b and 112a, 112b to thereby lift the pallets up and down above the assembly line surface 104.

As is illustrated in FIGS. 1 and 2, the moveable carriage assembly 120 is moved up and down via a vertical movement system 124 which includes a motor 126 that moves the carriage members 122a, 122b up and down the tracks 132 positioned on the vertical members 110a, 110b and 112a, 112b. In this implementation, the motor 126 is mounted on the side-wall frame 106b, however, a drive shaft 130, powered from the motor 126 via a chain 171, extends between the frame 106b to the frame 106a such that the motor 126 induces simultaneous movement at both ends of the carriage members 122a, 122b in a well known manner. The exact operation of the vertical movement system 124 will be described in greater detail hereinbelow. It will be appreciated that the following description indicates that chains are used to provide movement of the various members in this particular implementation. For the purposes of this application the term chain shall be defined as encompassing, without limitation, any chain or belt or other member capable of implementing the described movement without departing from the spirit of the present invention.

As is also illustrated in FIGS. 1 and 2, the pallet loading assembly 100 also includes a lateral movement system 134 which is coupled to two laterally moving arms 140a, 140b that are connected to the carriage members 122a, 122b so as to move inward and outward to thereby capture and release selected pallets in the manner that will be described in greater detail below. In this particular implementation, the lateral movement system 134 includes a motor 136 which induces the arms 140a, 140b to move towards and away from each other while maintaining a parallel orientation by sliding the arms 140a, 140b simultaneously along the carriage members 122a, 122b. As is illustrated in FIGS. 1 and 2, the motor 136 is connected to the end of the arms 140a, 140b attached to the side-wall frame 106a via a drive shaft 174 such that both ends of the arms 140a, 140b move inwardly and outwardly simultaneously so as to maintain the substantially parallel orientation between the arms during movement of the arms 140a, 140b.

The interconnection of the arms 140a, 140b to the carriage members 122a, 122b and the operation of the lateral movement system 134 will be described in greater detail hereinbelow. It will, however, be appreciated that the system described allows for the arms 140a, 140b to be moved inward and outward into spaces 144 defined by each pallet 102. In particular, as is illustrated, the typical pallet 102 includes laterally extending parallel members 148 that are interconnected via cross members 146 such that the space 144 is defined as the space inset from the outer edge of the laterally extended member 148 and the cross members 146. By positioning the arms 140a, 140b into the spaces 144, the arms 140a, 140b thereby provide support for the lower-most pallet such that a stack of pallets can be lifted by the vertical movement system 124 of the carriage assembly 120.

Further, the carriage assembly 120 can be positioned such that the lower-most pallet 102 is positioned on the assembly line surface 104 and the arms 140a, 140b can be moved outward of the spaces 144 such that the lower-most pallet is positioned on the surface 104 and the arms 140a, 140b can be moved vertically upward so as to be aligned with the space 144 of the next pallet and then inserted into the space 144 such that the remaining stack of pallets 102 can be lifted upwards off of the surface 104 thereby allowing the pallet positioned on the surface 104 of the assembly line to be transported along the assembly line for use on the assembly line system.

Figure 3:
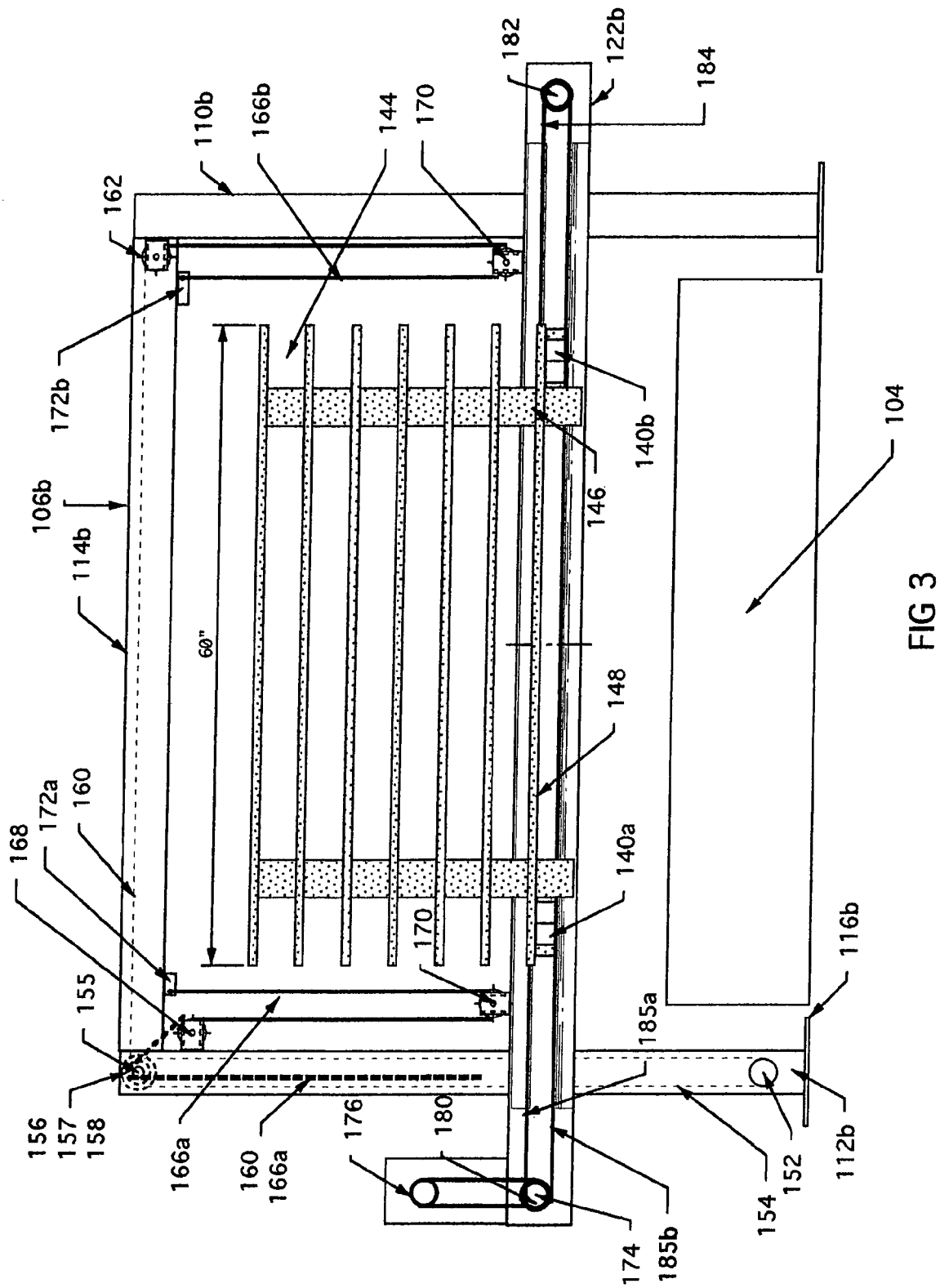
FIG. 3 is an end view of the pallet loading apparatus of FIG. 1.

FIG. 3 is an end view of the side-wall frame 106b, which illustrates the vertical movement system 124 and the lateral movement system 134 in greater detail. In particular, FIG. 3 illustrates the system for vertically moving the carriage assembly 120 in greater detail. As is illustrated, the motor 126 (FIG. 1) is coupled to a pulley 152 which rotates and thereby moves a vertical running chain 154 that is positioned within the vertical member 112. The chain 154 is coupled to an upper pulley 156 where the upper pulley 156 couples the chain 154 to a lifting chain 166a. The lifting chain 166a is routed over a roller 168 mounted on the front vertical member 112 and thereby extends around a roller 170a that is positioned on the carriage member 122a. Rotation of the pulley 152 by the motor 136 results in rotation of the upper pulley 156 which thereby results in either the lengthening or the shortening of the vertical chain 166a thereby lifting the carriage member 122a.

As is also illustrated in FIG. 3, a top chain 160 is attached to the upper pulley 156. The top chain 160 extends through the top cross member 114b and is routed around a roller 162 which is mounted on the back vertical member 110. The chain 160 then extends out of the top cross member 114b so as to define a lifting chain 166b which is routed around a roller 170 that is mounted on the end of the carriage member 122b adjacent to the vertical member 110b. The lifting chain 166b is further mounted to an anchor 172b that is attached to the top crosspiece 114b. In operation, rotation of the pulley 152 not only results in vertical movement of the lifting chain 166a, but also the lifting chain 166b such that both ends of the carriage member 122b are moved vertically simultaneously so as to maintain both ends of the member during movement. The pulley apparatus described in connection with FIG. 3 can thus move the carriage member 122b both upwards and downwards so as to vertically position the pallet on the surface 104 or raise the pallets above the surface 104.

The system 100 can also move the carriage member 122 such that the bottom-most pallet can be left on the surface 104 and such that the remaining pallets can be lifted off of the bottom-most pallet in the manner that will be described in greater detail below. It will be appreciated that the side-wall frame 106a includes substantially the same vertical movement mechanism as described in connection with FIG. 3 in that the vertical movement system drive shaft 130 rotates the corresponding pulley 152 in the side-wall frame 106a. More than one such vertical lifting assembly can be implemented depending on the needs of the system.

As is also illustrated in FIG. 3, the lateral movement system 134 is also, in this implementation, a pulley driven system. In particular, the motor 136 rotates a shaft 174 which moves a chain 176. The chain 176 is positioned about a pulley 180 which rotates in response to rotation of the shaft 174 of the motor 136. Also mounted on the pulley 180, is a continuous chain 184. The continuous chain 184 extends across the frame 106b to a pulley 182 mounted proximate the vertical member 110b. As illustrated, the continuous chain 184 has an upper section 185a and a lower section 185b. The first arm 140a is attached to the upper section 185a of the continuous chain 184 and the second arm 140b is attached to the lower section 185b of the continuous chain 184.

In operation, as the motor 136 rotates the continuous chain 184 clockwise, the upper section 185a of the chain 184 induces the arm 140a to move inward into the space 144a defined by the pallet 102. Similarly, the lower section 185b of the chain 184 induces the arm 140b to move inward into the space 144b defined by the pallet 102. Alternatively, when the continuous chain 184 is induced to move in a counterclockwise direction, the upper and lower sections 185a, 185b of the chain 184 respectively move the carriage arms 140a, 140b outward so as to remove the arms 140a, 140b from the spaces 144a, 144b. In this way, the motor 136 can selectively engage the arms 140a, 140b with the pallets 102 to allow for vertical movement or disengage the arms 140a, 140b to permit the lower-most pallet to be positioned on the surface 104 in the manner that will be described in greater detail hereinbelow.

The lateral movement system 134 allows for the simultaneous movement of the arms 140a, 140b both inward and outward with respect to the cross piece members 146 of the pallets 102. Hence, the lateral movement system 134 allows for the simultaneous positioning of the arms 140a, 140b into the spaces 144 and out of the spaces 144. It will again be appreciated that the side-wall frame 106a has a similar lateral movement system that is powered via a drive shaft 150 which is powered by the motor 136 such that both ends of the arms 140a, 140b can be moved inward and outward so as to maintain the arms in a generally parallel orientation with respect to each other.

Figure 4:
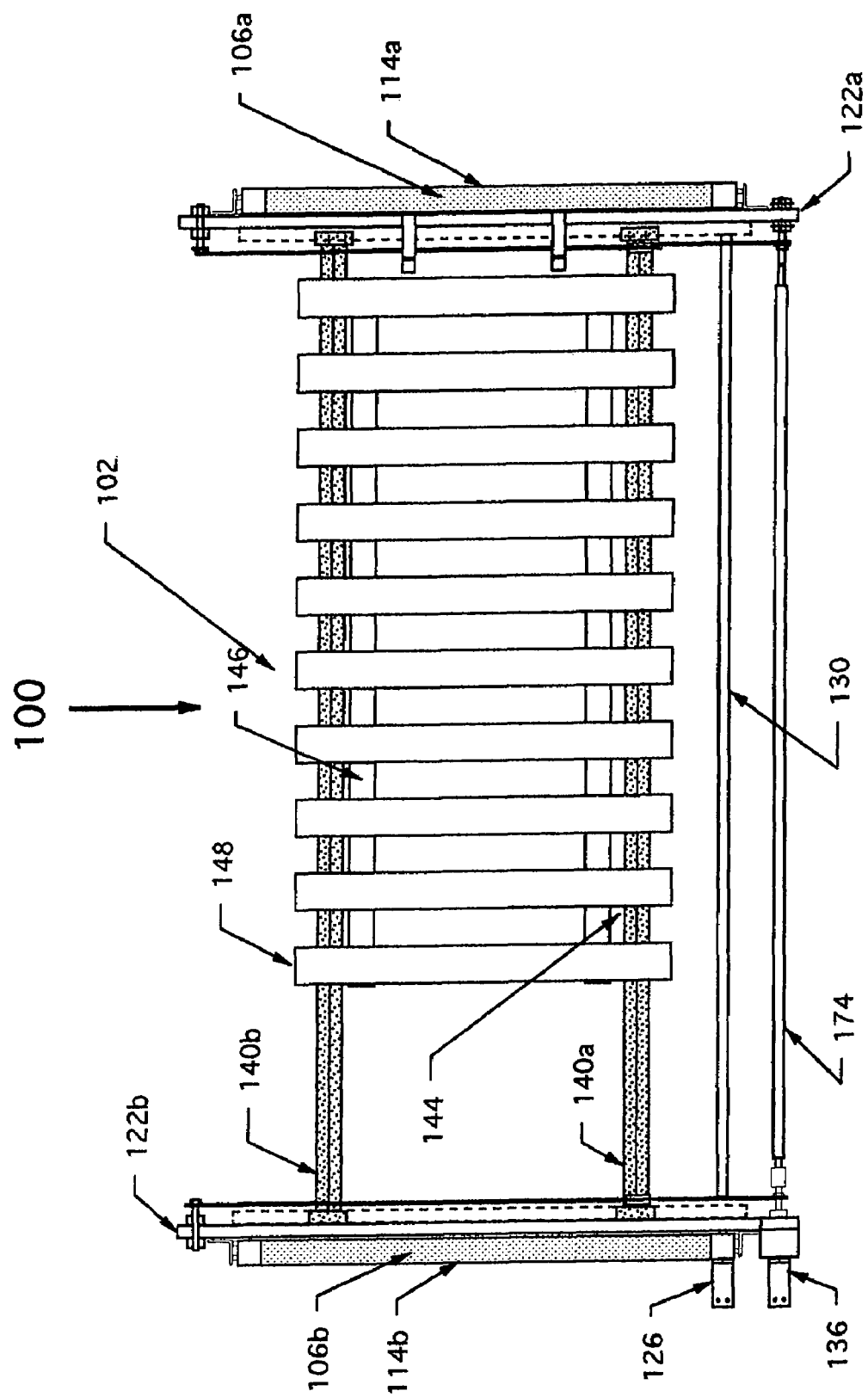
FIG. 4 is the top view of the pallet loading apparatus of FIG. 1.

FIG. 4 illustrates the positioning of the arms 140a, 140b into the space 144 defined by the pallets 102 to thereby facilitate the lifting and lowering of the pallets by the vertical movement mechanism. As is illustrated in FIG. 4, the arms 104a, 140b are preferably sized to accommodate the varying lengths of the pallets used in the assembly line, and thus the side-wall frame 106a, 106b are preferably spaced at a length that is suitable for accommodating the pallets. It will, of course, be apparent that the actual length of the arms 140a, 140b can vary depending upon the size of pallets that are to be used on the assembly line.

Figure 5:
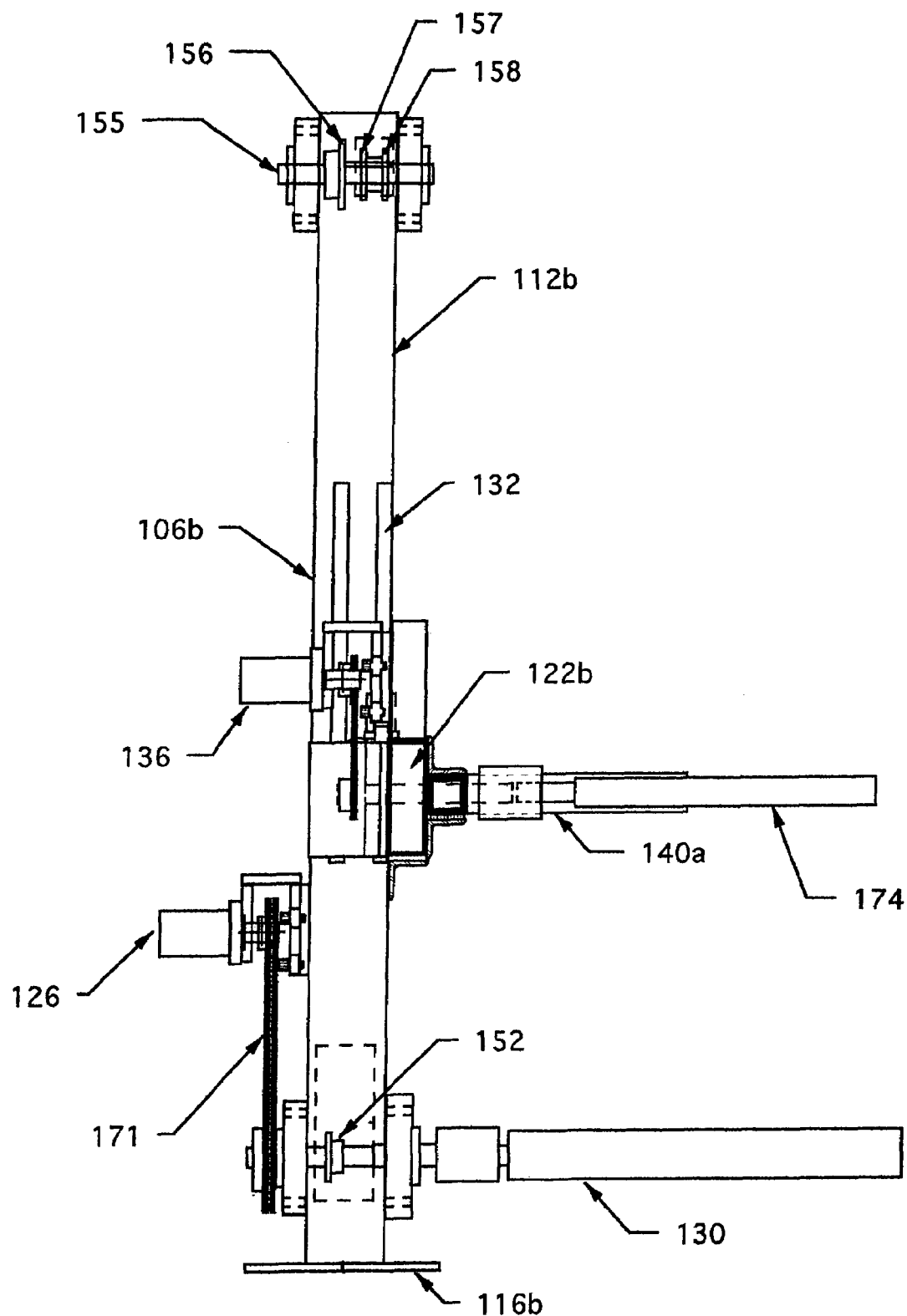
FIG. 5 is a detailed view of the movement mechanisms of the pallet loading apparatus of FIG. 1.
Figure 6:
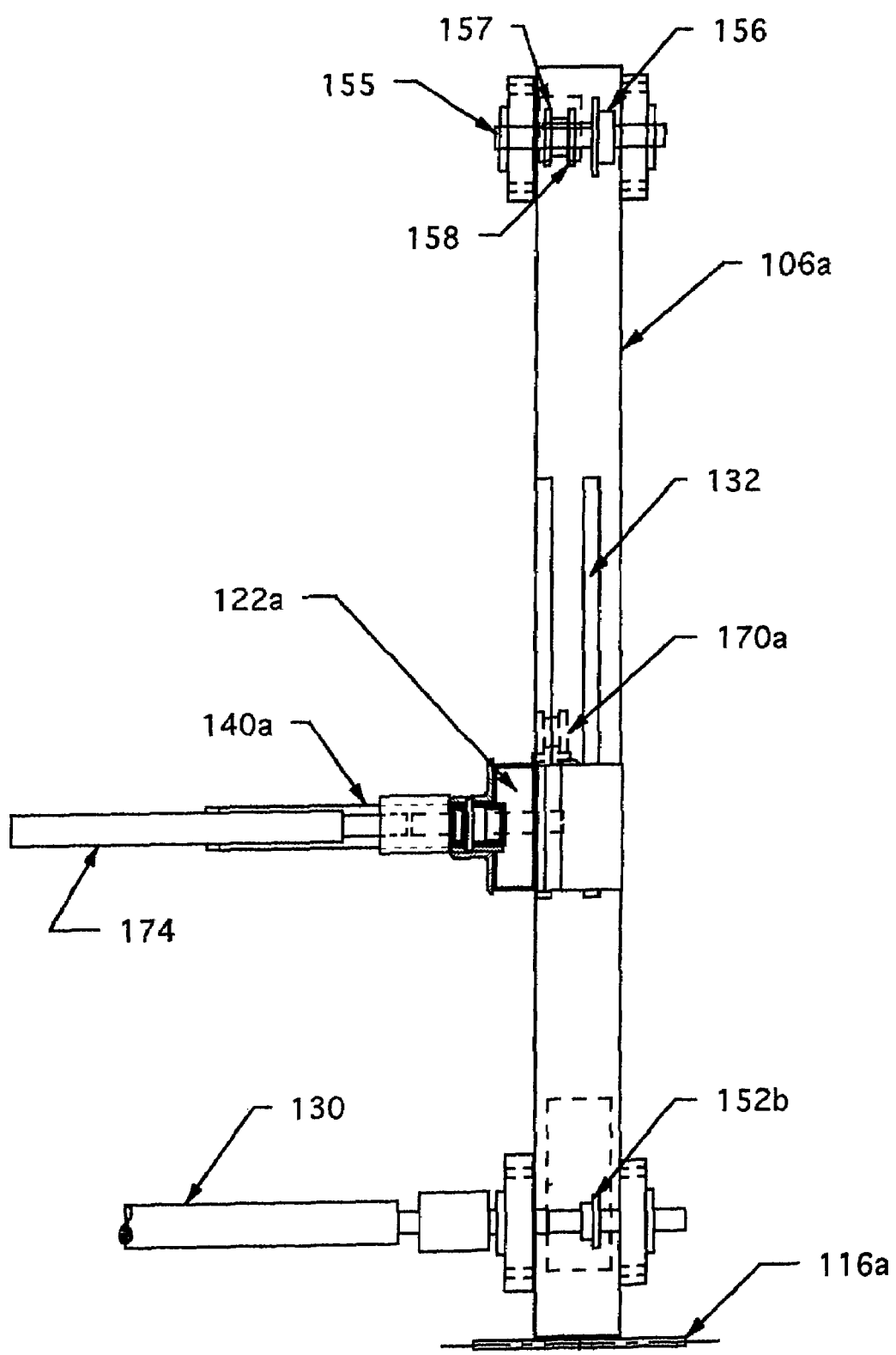
FIG. 6 is a detailed view of additional movement mechanisms of the pallet loading apparatus of FIG. 1.
Figure 7:
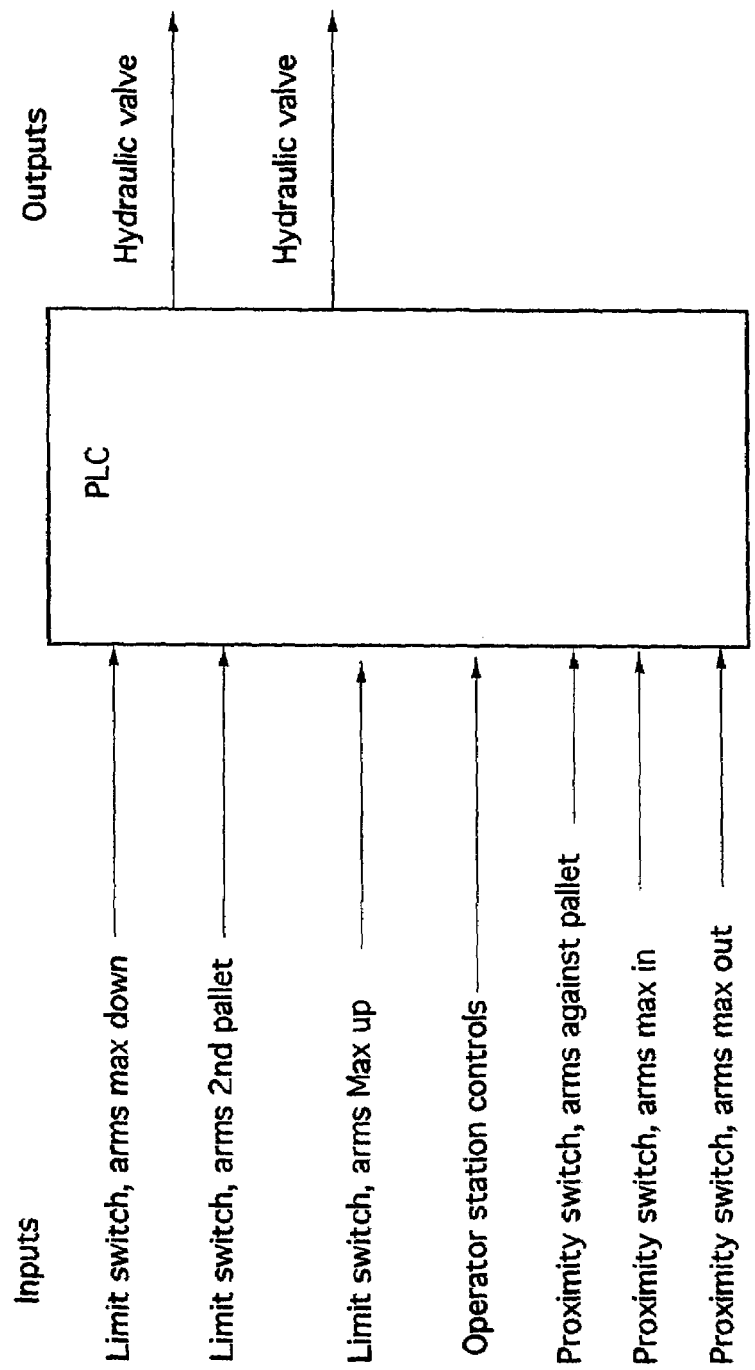
FIG. 7 is a schematic view illustrating the control system of the pallet loading apparatus of FIG. 1; and And FIGS. 8A–8H are schematic illustrations illustrating the position and operation of the pallet loading apparatus of FIG. 1.

FIGS. 5 and 6 are detailed drawings which illustrate the various components of the vertical and lateral movements systems in greater detail. It will, however, be apparent to a person of ordinary skill in the art that various modifications of these vertical and horizontal movement systems can be implemented without departing from the spirit of the present invention. In this implementation, the motors 126 and 136 are preferable hydraulic motors such as Char-Lynn motors from Eaton Corporation. Company. It will be appreciated that such hydraulic motors are controlled by appropriate solenoid valve controls. In this implementation, hydraulic motors are preferred as they reduce the amount of reduction gearing that would otherwise be required by electric motors. However, a person of skill in the art can appreciate that any different type of motor or movement device can be used to implement the described functionality and structure without departing from the spirit of the present invention.

In this particular implementation, the pallet loading assembly 100 is under the control of a control system 200 which receives various inputs from various switches mounted on the assembly. In particular, the control system 200 comprises a programmable logic control (PLC) that receives inputs from limit switches and proximity switches and also an operator station control. In particular, limit switches are installed on the assembly 100 to provide an indication of when the arms 140a, 140b are located in the down position such that the lowest pallet 102 is positioned on the surface 104, and also when the arms 140a, 140b are located at the vertical height of the space 144 defined by the second bottom-most pallet 102 in the stack of pallets 102. There is also a limit switch that is mounted on the assembly to indicate when the arms 140a, 140b are in the maximum vertical position. Hence, in this implementation the PLC receives information about the vertical movement system 124 as to these three vertical positions in this system. Specifically, the PLC receives a signal indicative of when the carriage arms are at the right height to position the bottom-most pallet on the assembly line surface 104, when the arms 140a, 140b are at the correct vertical height to be positioned into the space 144 of the second bottom-most pallet 102 and lastly, when the stack of pallets has been lifted to the desired raised position.

The PLC further receives controls from a series of proximity switches that are mounted on the arms 140a, 140b which indicate when the arms have been moved inward such that the arms are positioned against the pallet, when the arms have been positioned inward a pre-selected maximum amount and when the arms have been positioned out of the space 144 defined by the pallet 102 a predetermined amount. These proximity switches provide the inputs for the PLC to implement the functionality of the lateral movement system 134 such that the PLC can move the arms 140a, 140b inward and outward of the spaces 144 defined by the pallets 102.

Lastly, the PLC further receives, in this implementation, operator station controls whereby an operator can induce the assembly to position pallets on the assembly line, move the arms 140a, 140b out of engagement with the bottom-most pallet, raise the arms 140a, 140b to the height of the space 144 corresponding to the second bottom-most pallet, insert the arms 140a, 140b into the spaces 144 and then lift the arms 140a, 140b to a raised position thereby leaving the bottom-most pallet on the surface 104. While in this implementation operator station controls provide this input to induce the PLC 200 to perform these functions, it will be appreciated that this system can be automated such that an assembly line can provide an electronic signal to initiate a pallet positioning sequence. The PLC is programmed to resolve the inputs from the limit switches and the proximity switches and the proximity switches and the operator and/or system controls to thereby output to hydraulic valves output signals inducing the hydraulic motors 126 and 136 to rotate in the desired fashion.

FIGS. 8A–8H illustrate the various positions of the pallet loading system 100 as it sequentially positions pallets on the assembly line surface 104. As is illustrated in FIG. 8A, the stack of pallets 102 is preferably lowered by the vertical movement system 124 such that the lower-most pallet 102a is positioned on the surface 104. As is illustrated in FIG. 8A, the arms 140a, 140b are positioned within the spaces 144 of the lower-most pallet 102a such that the entire stack of pallets 102 can be vertically moved as a result of the positioning of the arms 140a, 140b in the space 144 of the lower-most pallet 102a.

As is illustrated in FIG. 8B, the carriage arms 140a, 140b are then retracted into the maximum out position by the lateral movement system 134 such that the arms are removed from the space 144. In this position, the lower-most pallet 102a is positioned on the assembly line surface 104 for subsequent delivery via the assembly line system. As is illustrated in FIG. 8C, the vertical movement mechanism 124 then lifts the arms 140a, 140b to the level of the second lowest pallet 102b such that the arms 140a, 140b are positioned in a location where they can be inserted into the space 144 of the second lower-most pallet 102b. The control system 200 then induces the arms 140 a, 140b to then be inserted into the spaces 144 of the second lowest pallet 102b in the manner shown in FIG. 8D.

Subsequently, the vertical movement mechanism lifts the second lowest pallet 102b upwards thereby lifting the stack of pallets 102 off of the lower-most pallet 102 in the manner shown in FIG. 8E. This allows the lower-most pallet 102a to then be delivered to the assembly line as is illustrated in FIG. 8F. Subsequently as is illustrated in FIGS. 8G and 8H, the process described with respect to FIGS. 8A and 8B is repeated for the second lower-most pallet 102b. This process can then be repeated for each of the pallets in the stack thereby allowing for the pallets to be sequentially deposited onto the surface 104 of the assembly line and delivered by the assembly line to an appropriate place.

It will be appreciated that the system reduces the need for individuals to hand load pallets onto the assembly line as a stack of pallets can be loaded into the pallet loading assembly 100 and then deposited onto the assembly line on an as needed basis. As a consequence, there is a substantial savings in labor and time required to load the pallets. It will be appreciated that the size and scale of this particular system can vary upon the application and that many multiples of pallets can be preloaded into the loading assembly for subsequent delivery to the assembly line.

Although the above disclosed embodiments of the present invention have shown, described and pointed out the fundamental novel features of the invention as applied to the above disclosed embodiments, it should be understood that various omissions, substitutions and changes in the form of the detail of the devices, system and/or methods illustrated may be made by those skilled in the art without departing from the scope of the present invention. Consequently the scope of the invention should not be limited to the foregoing description but should be defined by the appended claims.

What is claimed is:

1. A system for loading individual pallets each having a lifting space of a stack of pallets onto a surface of an assembly line, the system comprising:
   a pair of lifting arms adapted to be positioned within the lifting space defined by the pallets;
   a movement system coupled to the pair of arms that moves the pair of arms into and out of the lifting space of the pallets, wherein movement of the pair of arms into and out of the lifting space comprises movement of the arms towards and away from each other respectively and lifts the stack of pallets vertically with respect to the surface of the assembly line when the pair of arms are positioned within the lifting space of the lowest pallet in the stack of pallets; and
   a control system that provides control signals to the movement mechanism so as to (i) with the pair of lifting arms positioned in the lifting space of the lowest pallet of the stack, vertically position the stack of pallets such that the lowest pallet in the stack is positioned on the surface of the assembly line, (ii) move the pair of lifting arms so as to remove the arms from the lifting space of the lowest pallet, (iii) insert the pair of arms into the lifting space of the second lowest pallet, and (iv) vertically lift the second lowest pallet and the other pallets stacked thereon upwards away from the surface of the assembly line such that the lowest pallet can then be transported by the assembly line away from the surface.

2. The system of claim 1, wherein the control system repeats the steps (i)–(iv) to sequentially position pallets on the surface of the assembly line.

3. The system of claim 2, wherein the control system includes a user interface and implements the steps (i)–(iv) in response to user commands.

4. The system of claim 1, wherein the pair of lifting arms comprises a first and a second arm that are sized so as to be respectively positionable into a first and a second lifting space of each of the pallets.

5. The system of claim 4, wherein the movement system comprises a horizontal movement system that moves the pair of arms horizontally so as to position the arms into and out of the first and second lifting spaces of the pallets.

6. The system of claim 5, wherein the horizontal movement system comprises:
   a motor;
   a first rotor mounted adjacent the first side of the pallets;
   a second rotor mounted adjacent the second side of the pallets;
   a first continuous chain assembly that extends across the pallets between the first and second rotors and is engaged with the motor such that the motor can induce the first continuous chain assembly to move, wherein the first continuous chain assembly includes an upper section and a lower section and wherein the first and second arms are respectively coupled to the upper and lower sections such that movement of the chain in a first direction results in the first and second arms being respectively inserted into the first and second lifting spaces and such that movement of the chain in a second direction results in the first and second arms being respectively extracted from the first and second lifting spaces.

7. The system of claim 6, wherein the first and second rotors are mounted adjacent a first end of the pallets and wherein the horizontal movement system further comprises:
   a transmission member mechanically coupled to the motor;
   a third rotor mounted adjacent the first side of the pallets adjacent a second end of the pallets;
   a second rotor mounted adjacent the second side of the pallets adjacent a second end of the pallets;
   a second continuous chain assembly that extends across the pallets between the third and fourth rotors and is engaged with the motor via the transmission member such that the motor can induce the second continuous chain assembly to move, wherein the second continuous chain assembly includes an upper section and a lower section and wherein the first and second arms are respectively coupled to the upper and lower sections such that movement of the chain in a first direction results in the first and second arms being respectively inserted into the first and second lifting spaces and such that movement of the chain in a second direction results in the first and second arms being respectively extracted from the first and second lifting spaces.

8. The system of claim 6, wherein the movement mechanism comprises a vertical movement mechanism that moves the arms vertically to thereby lift the stack of pallets.

9. The system of claim 8, wherein the vertical movement mechanism includes a motor and a pulley system that lifts and lowers the first end of the first and the second arms.

10. The system of claim 9, wherein the pulley assembly is also coupled to a second end of the first and second arms so as to simultaneously lift and lower the first and second ends of the arms while maintaining the arms in a parallel orientation with respect to the assembly line surface.

11. A system for loading pallets formed of parallel pieces attached to two parallel cross pieces so as to define a loading surface and a first and second lifting space located underneath the loading surface adjacent the cross pieces, the system comprising:
- a first frame member;
- a second frame member spaced from the first frame member so as to define a surface therebetween;
- a carriage assembly coupled to the first and second frame members so as to be vertically movable with respect to the frame members;
- a pair of lifting arms coupled to the carriage assembly so as to extend between the first and second frame members and so as to be vertically movable in conjunction with movement of the carriage assembly, wherein the pair of lifting arms are inwardly and outwardly movable;
- at least one movement mechanism that moves the carriage assembly up and down and the pair of lifting arms inward and outward towards and away from each other respectively, wherein the at least one movement mechanism is controllable so as be able to (i) insert the pair of lifting arms into the lifting spaces of a first pallet, (ii) move the stack of pallets such that the first pallet is positioned on a surface, (iii) remove the pair of lifting arms from the space of the first pallet while the first pallet is on the surface, (iv) position the lifting arms into the lifting space of a second pallet positioned on top of the first pallet while the first pallet is on the surface, and (v) elevate the second pallet and any pallet stacked thereon upwards from the first pallet to allow the first pallet to be removed from the surface.

12. The system of claim 11, further comprising a control system wherein the control system induces the movement system to repeat the steps (i)–(v) to sequentially position pallets on the surface of the assembly line.

13. The system of claim 12, wherein the control system includes a user interface and implements the steps (i)–(v) in response to user commands.

14. The system of claim 11, wherein the at least one movement mechanism comprises a horizontal movement system that moves the arms horizontally so as to position the arms into and out of the first and second lifting spaces of the pallets.

15. The system of claim 14, wherein the horizontal movement system comprises:
- a motor mounted on the first frame member;
- a first rotor mounted on the first frame member adjacent a first side of the pallets;
- a second rotor mounted on the first frame member adjacent the second side of the pallets; and
- a first continuous chain assembly that extends across the pallets between the first and second rotors and is engaged with the motor such that the motor can induce the first continuous chain assembly to move, wherein the first continuous chain assembly includes an upper section and a lower section and wherein the first and second arms are respectively coupled to the upper and lower sections such that movement of the chain in a first direction results in the first and second arms being respectively inserted into the first and second lifting spaces and such that movement of the chain in a second direction results in the first and second arms being respectively extracted from the first and second lifting spaces.

16. The system of claim 15, wherein the first and second rotors are mounted adjacent a first end of the pallets and wherein the horizontal movement system further comprises:
- a transmission member mechanically coupled to the motor extending between the first and second frame members;
- a third rotor mounted on the second frame member adjacent the first side of the pallets adjacent a second end of the pallets;
- a second rotor mounted on the second frame member adjacent the second side of the pallets adjacent a second end of the pallets; and
- a second continuous chain assembly that extends across the pallets between the third and fourth rotors and is engaged with the motor via the transmission member such that the motor can induce the second continuous chain assembly to move, wherein the second continuous chain assembly includes an upper section and a lower section and wherein the first and second arms are respectively coupled to the upper and lower sections such that movement of the chain in a first direction results in the first and second arms being respectively inserted into the first and second lifting spaces and such that movement of the chain in a second direction results in the first and second arms being respectively extracted from the first and second lifting spaces.

17. The system of claim 16, wherein the transmission member comprises a shaft.

18. The system of claim 14, wherein the movement mechanism comprises a vertical movement mechanism that moves the carriage assembly vertically to thereby lift the stack of pallets.

19. The system of claim 18, wherein the vertical movement mechanism includes a motor and a pulley system that lifts and lowers the first end of the first and the second arms.

20. The system of claim 19, wherein the pulley assembly is also coupled to a second end of the first and second arms so as to simultaneously lift and lower the first and second ends of the arms while maintaining the arms in a parallel orientation with respect to the assembly line surface.

* * * * *